United States Patent
Gurjar

(10) Patent No.: US 11,343,898 B2
(45) Date of Patent: May 24, 2022

(54) SMART DIMMING AND SENSOR FAILURE DETECTION AS PART OF BUILT IN DAYLIGHT HARVESTING INSIDE THE LUMINAIRE

(71) Applicant: APPLETON GRP LLC, Rosemont, IL (US)

(72) Inventor: Ravindra Viraj Gurjar, Pune (IN)

(73) Assignee: APPLETON GRP LLC, Rosemont, IL (US)

( * ) Notice: Subject to any disclaimer, the term of this patent is extended or adjusted under 35 U.S.C. 154(b) by 0 days.

(21) Appl. No.: 16/786,213

(22) Filed: Feb. 10, 2020

(65) Prior Publication Data

US 2021/0092822 A1    Mar. 25, 2021

(30) Foreign Application Priority Data

Sep. 20, 2019   (IN) .............................. 201921037990

(51) Int. Cl.
*H05B 47/11*   (2020.01)
*H05B 47/20*   (2020.01)
*H05B 47/175*  (2020.01)

(52) U.S. Cl.
CPC ............. *H05B 47/20* (2020.01); *H05B 47/11* (2020.01); *H05B 47/175* (2020.01)

(58) Field of Classification Search
CPC ............ H05B 33/0845; H05B 33/0857; H05B 33/086; H05B 37/0227; H05B 37/0245;
(Continued)

(56) References Cited

U.S. PATENT DOCUMENTS 6,548,967 B1    4/2003   Dowling et al.
6,646,545 B2   11/2003   Bligh
(Continued)

FOREIGN PATENT DOCUMENTS

CA    2708978 C    3/2016
EP    0872163 B1   8/1999

OTHER PUBLICATIONS

U.S. Appl. No. 16/738,898, Event Indications of Hazardous Environment Luminaires Using Visual Sequences, filed Jan. 9, 2020.
(Continued)

*Primary Examiner* — Tung X Le
(74) *Attorney, Agent, or Firm* — Marshall, Gerstein & Borun LLP

(57) ABSTRACT

A self-adjusting luminaire whose primary operation is to provide ambient or focused lighting in a hazardous environment is configured to modify (e.g., continuously) the energization intensity levels of its on-board illumination sources based on magnitudes of difference between an amount of light in the environment of the luminaire (e.g., including both light produced by the luminaire and ambient light) as measured by on-board sensors and a setpoint amount of light corresponding to the luminaire. Further, the self-adjusting luminaire may detect that its on-board sensors are malfunctioning when the illumination sensors fail to sense a change in the amount of light in the environment of the luminaire after the luminaire has modified the energization intensity levels of its illumination sources. Upon detecting a sensor malfunction, the self-adjusting luminaire may generate an alarm, and/or may automatically modify the intensity of its illumination sources to mitigate effects of the detected malfunction.

25 Claims, 5 Drawing Sheets

(58) Field of Classification Search
CPC .... H05B 37/0272; H05B 47/11; H05B 47/19;
H05B 47/20; H05B 47/175
USPC ........................................ 315/152, 307, 312
See application file for complete search history.

(56) References Cited

U.S. PATENT DOCUMENTS

| | | | |
|---|---|---|---|
| 7,199,724 B2 | 4/2007 | Danvir et al. | |
| 7,221,104 B2 | 5/2007 | Lys et al. | |
| 7,309,965 B2 | 12/2007 | Dowling et al. | |
| 7,333,903 B2 | 2/2008 | Walters et al. | |
| 7,546,168 B2 | 6/2009 | Walters et al. | |
| 7,604,378 B2* | 10/2009 | Wolf .................. | A01M 1/2083 |
| | | | 362/253 |
| 7,614,767 B2 | 11/2009 | Zulim et al. | |
| 7,683,301 B2 | 3/2010 | Papamichael et al. | |
| 7,781,713 B2 | 8/2010 | Papamichael et al. | |
| 7,859,398 B2 | 12/2010 | Davidson et al. | |
| 7,915,829 B2 | 3/2011 | Keller et al. | |
| 8,364,325 B2 | 1/2013 | Huizenga et al. | |
| 8,731,689 B2 | 5/2014 | Plainer et al. | |
| 8,757,847 B2 | 6/2014 | Sett et al. | |
| 8,942,564 B2 | 1/2015 | Jovicic et al. | |
| 9,049,756 B2 | 6/2015 | Klusmann et al. | |
| 9,080,747 B1 | 7/2015 | Hetrick | |
| 9,119,169 B2 | 8/2015 | Luo et al. | |
| 9,143,230 B2 | 9/2015 | Casaccia et al. | |
| 9,215,784 B2 | 12/2015 | Plainer et al. | |
| 9,247,620 B2 | 1/2016 | Gritti et al. | |
| 9,398,588 B2 | 7/2016 | Wang et al. | |
| 9,473,248 B2 | 10/2016 | Yang et al. | |
| 9,520,939 B2 | 12/2016 | Jovicic et al. | |
| 9,612,585 B2 | 4/2017 | Aggarwal et al. | |
| 9,622,330 B2 | 4/2017 | Lashina et al. | |
| 9,660,727 B2 | 5/2017 | Jovicic et al. | |
| 9,679,448 B2 | 6/2017 | Koosha et al. | |
| 9,686,838 B2 | 6/2017 | Elwell et al. | |
| 9,721,442 B2 | 8/2017 | Denteneer et al. | |
| 9,735,868 B2 | 8/2017 | Jovicic et al. | |
| 9,754,466 B2 | 9/2017 | Simmons | |
| 9,804,024 B2* | 10/2017 | Jones .................... | H05B 31/50 |
| 9,813,150 B1 | 11/2017 | Bitra et al. | |
| 9,832,826 B2 | 11/2017 | Rodriguez et al. | |
| 9,843,386 B2 | 12/2017 | Baggen et al. | |
| 9,857,162 B1 | 1/2018 | Gum et al. | |
| 9,871,585 B2 | 1/2018 | Rietman et al. | |
| 9,930,166 B2 | 3/2018 | Garcia Morchon | |
| 9,930,758 B2 | 3/2018 | Jayawardena et al. | |
| 9,955,541 B2 | 4/2018 | Dowling et al. | |
| 9,955,549 B2 | 4/2018 | Zhang et al. | |
| 9,961,747 B2 | 5/2018 | Kumar et al. | |
| 9,970,639 B2 | 5/2018 | Yadav et al. | |
| 10,006,592 B2 | 6/2018 | Carney et al. | |
| 10,009,100 B2 | 6/2018 | Jovicic et al. | |
| 10,020,881 B2 | 7/2018 | Jovicic | |
| 10,021,770 B2 | 7/2018 | Turvy, Jr. et al. | |
| 10,027,409 B2 | 7/2018 | Rietman et al. | |
| 10,034,314 B2 | 7/2018 | White et al. | |
| 10,040,007 B2 | 8/2018 | Adam | |
| 10,064,248 B2 | 8/2018 | Janik et al. | |
| 10,068,442 B2 | 9/2018 | Chong et al. | |
| 10,117,300 B2 | 10/2018 | Doheny et al. | |
| 10,128,948 B2 | 11/2018 | Jovicic | |
| 10,135,696 B2 | 11/2018 | Koosha et al. | |
| 10,190,759 B2 | 1/2019 | Yadav et al. | |
| 10,194,513 B2 | 1/2019 | Jayawardena et al. | |
| 10,260,722 B2 | 4/2019 | Treible, Jr. et al. | |
| 10,321,541 B2 | 6/2019 | Bora et al. | |
| 10,355,781 B2 | 7/2019 | Verma et al. | |
| 10,371,345 B2 | 8/2019 | Nolan et al. | |
| 10,378,738 B1 | 8/2019 | Davis | |
| 10,378,748 B2 | 8/2019 | Ott | |
| 10,383,191 B2 | 8/2019 | Jayawardena et al. | |
| 10,400,996 B2 | 9/2019 | Holder et al. | |
| 10,401,007 B1 | 9/2019 | York et al. | |
| 10,408,442 B2 | 9/2019 | Treible, Jr. et al. | |
| 10,422,494 B2 | 9/2019 | Moghal et al. | |
| 10,470,267 B2* | 11/2019 | Pope ...................... | H05B 47/11 |
| 10,510,222 B2 | 12/2019 | Eddins et al. | |
| 2011/0031806 A1* | 2/2011 | Altonen .............. | H05B 47/105 |
| | | | 307/32 |
| 2012/0206050 A1* | 8/2012 | Spero .................... | F21S 41/147 |
| | | | 315/152 |
| 2014/0175985 A1* | 6/2014 | Billig .................... | H05B 47/11 |
| | | | 315/130 |
| 2014/0292208 A1* | 10/2014 | Chemel ................. | H05B 47/11 |
| | | | 315/154 |
| 2014/0327362 A1 | 11/2014 | Ashdown | |
| 2014/0375222 A1* | 12/2014 | Rains, Jr. .............. | G06N 3/08 |
| | | | 315/158 |
| 2015/0084520 A1 | 3/2015 | Reed | |
| 2015/0195880 A1 | 7/2015 | Barnetson et al. | |
| 2016/0066391 A1 | 3/2016 | Delnoij et al. | |
| 2016/0128154 A1 | 5/2016 | Barnetson et al. | |
| 2017/0006690 A1 | 1/2017 | Hoang | |
| 2017/0042001 A1 | 2/2017 | Chemel et al. | |
| 2017/0181247 A1 | 6/2017 | Husen et al. | |
| 2017/0339765 A1 | 11/2017 | Barnetson et al. | |
| 2018/0255627 A1* | 9/2018 | Aggarwal .............. | H04W 4/70 |
| 2019/0023460 A1 | 1/2019 | Veness | |
| 2019/0159322 A1 | 5/2019 | Jayawardena et al. | |
| 2019/0208598 A1 | 7/2019 | Davis et al. | |
| 2019/0214019 A1* | 7/2019 | White .................... | G01S 3/802 |
| 2019/0215935 A1 | 7/2019 | Trublowski et al. | |
| 2019/0226666 A1 | 7/2019 | Davis et al. | |
| 2019/0234603 A1 | 8/2019 | Treible, Jr. et al. | |
| 2019/0257496 A1 | 8/2019 | Pyshos et al. | |
| 2019/0257934 A1 | 8/2019 | Riley et al. | |
| 2019/0261301 A1 | 8/2019 | Riley et al. | |
| 2019/0261477 A1 | 8/2019 | Barnetson et al. | |
| 2019/0277482 A1 | 9/2019 | Newton | |
| 2019/0285259 A1 | 9/2019 | Tickner et al. | |

OTHER PUBLICATIONS

U.S. Appl. No. 16/786,219, Smart Luminaire Group Control Using Intragroup Communication, filed Feb. 10, 2020.
U.S. Appl. No. 16/793,121, Luminaire as an Intrinsically Safe Power Source, filed Feb. 18, 2020.
U.S. Appl. No. 16/790,041, Connected Controls Infrastructure, filed Feb. 13, 2020.
IN Application No. 201921035199, Event Indications of Hazardous Environment Luminaires Using Visual Sequences, filed Aug. 31, 2019.
IN Application No. 201921036250, Smart Luminaire Group Control Using Intragroup Communication, filed on Oct. 7, 2019.
IN Application No. 201921037587, Smart Luminaire Group Control Using Intragroup Communication, filed Sep. 18, 2019.
IN Application No. 201921036251, Connected Controls Infrastructure, filed Sep. 9, 2019.
IN Application No. 201921041224, Connected Controls Infrastructure, filed Oct. 11, 2019.
IN Application No. 201921036251, Connected Controls Infrastructure, filed Oct. 19, 2019.
IN Application No. 202021003289, Luminaire as an Intrinsically Safe Power Source, filed Jan. 24, 2020.
IN Application No. 201921037990, Sensor Device Design and Mounting Construction for Connected Led Lighting, filed Sep. 20, 2019.
IN Application No. 201921038344, Sensor Device Design and Mount for Affixing Sensor Device to a Luminaire, filed Sep. 23, 2019.
IN Application No. 201921036250, Smart Luminaire Group Control Using Intragroup Communication, filed Sep. 9, 2019.
International Search Report and Written Opinion for Application No. PCT/US2020/047434, dated Dec. 17, 2020.
First Examination Report for India Application No. 201921037990, dated Jul. 13, 2021.

* cited by examiner

SMART DIMMING AND SENSOR FAILURE DETECTION AS PART OF BUILT IN DAYLIGHT HARVESTING INSIDE THE LUMINAIRE

CROSS REFERENCE TO RELATED APPLICATIONS

This application claims priority to Indian Patent Application No. 201921037990, which was filed on Sep. 20, 2019 and entitled "SMART DIMMING & SENSOR FAILURE DETECTION AS PART OF BUILT IN AMBIENT LIGHT HARVESTING INSIDE THE LUMINAIRE," the entire contents of which are hereby incorporated by reference.

FIELD OF THE DISCLOSURE

This disclosure relates to self-adjusting luminaires, lighting units, and light fixtures that are disposed in hazardous environments, such as intrinsically safe and/or explosion proof luminaires, lighting units, and light fixtures that provide ambient, task, and/or focused light within hazardous environments.

BACKGROUND

The background description provided within this document is for the purpose of generally presenting the context of the disclosure. Work of the presently named inventors, to the extent described in this background section, as well as aspects of the description that may not otherwise qualify as prior art at the time of filing, are neither expressly nor impliedly admitted as prior art against the present disclosure.

Intrinsically safe and/or explosion proof luminaires, lighting units, and light fixtures provide general, ambient light and/or task or focused light within hazardous environments such as industrial process plants, manufacturing facilities, oil refineries, power-generating systems, mines, and the like. As such, intrinsically safe and/or explosion proof luminaires, lighting units, and light fixtures must comply with all standards and/or regulatory rules that are applicable to the particular hazardous environment in which they are disposed, e.g., to prevent ignition and/or explosion of hazardous atmospheric mixtures such as flammable gases and/or dust, to protect electronics within the luminaire from being compromised or damaged, to contain any explosion that may occur, etc. Such luminaires may be rated by Class, Division, and Group. For example, a Class 1, Division 1, Group D, E, and F is a commonly required rating for products that are located in hazardous environments within the petrochemical industry, in which flammable vapors may be present. Generally speaking, intrinsically safe and/or explosion proof luminaires, lighting units, and light fixtures are designed to limit undesirable and/or dangerous effects of thermal and/or electrical energy generated during both their normal use and maintenance, as well as during fault conditions. For ease of reading, intrinsically safe and/or explosion proof luminaires, lighting units, and/or light fixtures that are located in hazardous environments are generically referred to herein as "hazardous environment (HE) luminaires, lighting units, and/or light fixtures", and/or simply as "luminaires, lighting units, and/or light fixtures."

Currently, many luminaires, lighting units, and light fixtures provide light at a fixed, factory-configured level of intensity. However, when there is also ambient light in the environment of a luminaire (e.g., sunlight entering through a window), maintaining a fixed, factory-configured level of intensity may waste energy and affect the useful life of the illumination sources (e.g., LEDs) of the luminaire.

Some known luminaires, lighting units, and light fixtures are configured to save energy using ambient light harvesting techniques. Generally speaking, ambient light harvesting techniques involve dimming or powering off a luminaire when there is more ambient light generated by other sources in the environment of the luminaire, and powering on or increasing the light produced by the luminaire when there is less ambient light generated by other sources in the environment of the luminaire. For instance, some known luminaires are configured to dim or brighten based on the time of day, to account for expected daylight at each time of day, etc. Additionally, some known luminaires are controlled based on external light sensors which detect ambient light, and such luminaires are powered on when the detected ambient light falls below a certain threshold or powered off when the detected ambient light rises above a different threshold. For instance, light sensors disposed in an environment of the luminaire may detect ambient light and transmit an indication of the detected ambient light to a controller, which generates control signals for turning on and off the luminaire in an ambient light harvesting mode based on the ambient light detected by the sensors. Furthermore, some known luminaires use the amount of ambient light that is measured when the luminaire powers up for the first time as a setpoint amount of ambient light.

Known luminaires, lighting units, and light fixtures that use ambient light harvesting techniques, though, typically do not account for the ways in which these ambient light harvesting techniques affect users or operators working in the hazardous environment. For example, drastic or sudden changes in light may be startling, distracting, or annoying to users or operators working in the hazardous environment. Distracting or startling a user or operator is particularly dangerous in the context of a hazardous environment because a distracted or startled user or operator may miss warning signs of imminent dangerous events such as explosions or toxic spills.

Moreover, some known luminaires that use ambient light harvesting techniques rely on a same set of multiple light sensors positioned in different locations in the same environment to determine whether any of the light sensors are malfunctioning. For instance, known luminaires may determine that one of several light sensors in an environment is malfunctioning if the light sensor measures a different amount of ambient light than the other light sensors in the environment. However, known luminaires, lighting units, and light fixtures that use ambient light harvesting techniques typically are not capable of determining, by a given luminaire, that a light sensor associated with that luminaire is malfunctioning without receiving information from or about other light sensors in the environment. Consequently, known luminaires have no way of detecting a light sensor error if a wired or wireless connection between the luminaire and the other light sensors in the environment is not operational or suffers from significant interference and/or degraded performance. Light sensor errors in ambient light harvesting luminaires are particularly dangerous in hazardous environments because lighting may affect the ability of users or operators within the hazardous environment to do their jobs. For instance, if a light sensor erroneously detects high levels of ambient light and accordingly causes the illumination sources of the luminaire to energize at low intensity levels, users or operators within the hazardous environment may be unable to fully see critical issues occurring in the hazardous environment, such as warning signs of imminent spills or explosions.

SUMMARY

The systems, methods, and techniques disclosed herein relate to a self-adjusting hazardous environment (HE) luminaire, lighting unit, or light fixture disposed in a hazardous environment. During its normal run-time operations, embodiments of the disclosed HE luminaire, lighting unit, or light fixture radiates general or ambient light and/or task or focused light into the hazardous environment. In particular, the disclosed self-adjusting HE luminaire, lighting unit, or light fixture is configured to continuously modify the intensity at which its illumination sources are energized based on a difference between a measured amount of light in the environment of the luminaire (i.e., which includes both ambient light and light produced by the luminaire) and a setpoint (e.g., target) amount of light for the hazardous environment.

Advantageously, the self-adjusting luminaire automatically makes larger changes to the intensity at which the illumination sources of the self-adjusting luminaire are energized when there are larger differences between the measured amount of light and the setpoint amount of light, and makes smaller changes to the intensity at which the illumination sources of the self-adjusting luminaire are energized when there are smaller differences between the measured amount of light and the setpoint amount of light. In this way, the self-adjusting luminaire modifies the intensity of its illumination sources until the setpoint amount of light is achieved, in a way that appears to be gradual to a user or operator in the hazardous environment, reducing the chances that a user or operator in the hazardous environment is startled or distracted by the adjustment. Furthermore, in some examples, the self-adjusting luminaire modifies the intensity of its illumination sources until the measured amount of light is within a certain small range of the setpoint amount of light (e.g., within 10% of the setpoint amount of light). In this way, the self-adjusting luminaire avoids annoying or distracting users with frequent modifying (which may be seen as flickering or flashing) as the measured amount of light in the environment of the luminaire approaches or exceeds the setpoint amount of light from above or below.

Additionally, the self-adjusting luminaire can determine whether its on-board light sensor (used interchangeably with "illumination sensor" herein) is malfunctioning based on the light sensor's own measurements. In particular, if a self-adjusting luminaire modifies the intensity of one or more of its illumination sources, but the light sensor detects no change (or a change below an alarm threshold value) in the amount of light in the environment, the self-adjusting luminaire may determine that the light sensor is malfunctioning. Accordingly, in some examples, the self-adjusting luminaire may generate an alarm indicating that the light sensor is malfunctioning, e.g., and may transmit the alarm to a lighting control system. Moreover, in some examples, the self-adjusting luminaire may additionally or alternatively modify the intensity of one or more of its illumination sources to full power so that light sensor errors do not affect users or operators in the hazardous environment. Advantageously, because the self-adjusting luminaire is able to determine light sensor errors without external information, in some examples, the self-adjusting luminaire may accommodate light sensor errors even if a wired or wireless network in the hazardous environment is not operational or suffers from interference or other performance-affecting conditions.

In an embodiment, a luminaire is provided. The luminaire comprises: one or more processors; one or more illumination sources; one or more drivers; one or more illumination sensors configured to measure amounts of light in an environment associated with the luminaire, the light in the environment associated with the luminaire including both ambient light and light provided by the one or more illumination sources; and one or more memories storing a set of computer-executable instructions that, when executed by the one or more processors, cause the luminaire to: cause the one or more drivers to energize the one or more illumination sources to generate light at a first intensity level; determine a modification to the first intensity level based on a magnitude of a difference between a setpoint amount of light and a first amount of light, the first amount of light measured by the one or more illumination sensors while the one or more illumination sources are energized to generate light at the first intensity level; and cause the one or more drivers to modify the first intensity level based on the determined modification.

In an embodiment, a method performed by a self-adjusting luminaire is provided. The method comprises: continuously measuring, by one or more sensors included in the self-adjusting luminaire over an interval of time, an amount of light within an environment associated with the self-adjusting luminaire, the light within the environment associated with the self-adjusting luminaire including both ambient light and light provided by one or more illumination sources of the luminaire; and modifying, over the interval of time in accordance with the continuous measuring, an energization of the one or more illumination sources of the self-adjusting luminaire based on a magnitude of a difference between a measured amount of light in the environment and a setpoint amount of light.

DETAILED DESCRIPTION

Figure 1:
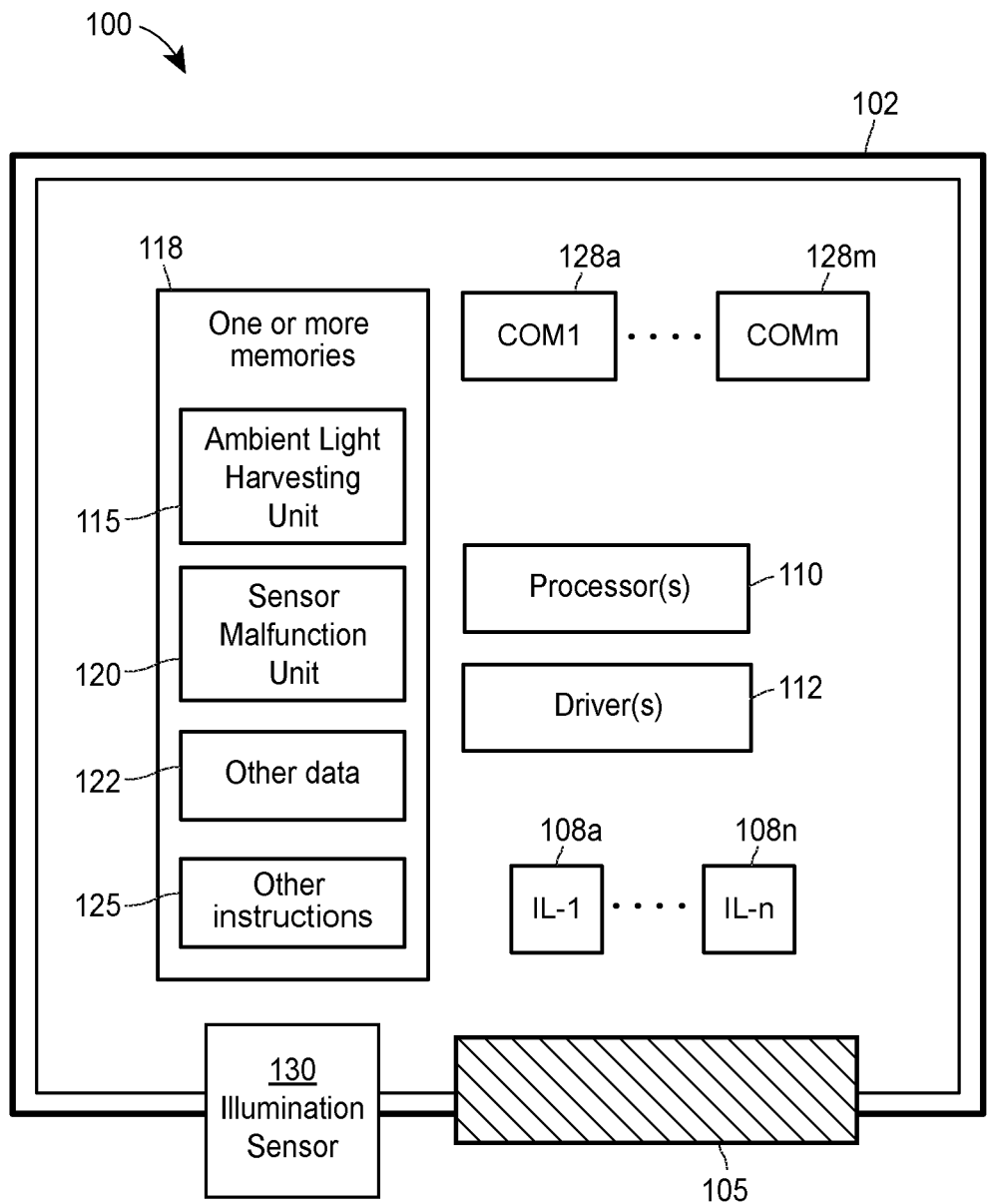
FIG. 1 is a block diagram of an example self-adjusting hazardous environment lighting unit, light fixture, or luminaire.

FIG. 1 is a block diagram of an example self-adjusting hazardous environment lighting unit, light lighting unit, light fixture, or luminaire 100 that modifies the energization intensity levels of its on-board illumination sources based on the difference between the amount of light in the environment of the self-adjusting luminaire as measured by on-board sensors and a setpoint amount of light associated with the luminaire, and detects malfunctions associated with the on-board sensors The terms "lighting unit", "light fixture", and "luminaire" are utilized interchangeably herein to refer to an electrically powered group of components that operates to supply general or ambient light and/or task or focused light in the portion of the electromagnetic spectrum that is visible to the human eye, e.g., from about 380 to 740 nanometers. The luminaire 100 is disposed within a hazardous environment, such as an industrial process plant, a manufacturing facility, an oil refinery, a power-generating system, a mine, etc. As such, the luminaire 100 is a hazardous environment (HE) luminaire that is compliant with any (and in some cases, all) standards and/or regulations governing its configuration, installation, and usage within the hazardous environment. That is, the luminaire 100 complies with standard and/or regulated thermal and electrical limits so as to limit the energy generated by the luminaire 100 that is available for potential ignition and/or explosion within the hazardous environment. Further, the HE luminaire 100 includes at least one hazardous location enclosure or housing 102 in which its components are typically disposed or enclosed. For example, the hazardous location enclosure or housing 102 may be explosion-proof, flame-proof, waterproof, sealed, hermetically sealed, dust ignition protected, etc. In some embodiments of the luminaire 100 (not shown in FIG. 1), a single luminaire 100 may include multiple hazardous location enclosures or housings 102, each of which surrounds a different subset of components of the luminaire 100; however, for ease of reading herein (and not for limitation purposes) the hazardous location enclosure or housing 102 is referred to using the singular tense. Moreover, at least one portion 105 of the hazardous location enclosure or housing 102 is at least partly transparent or visible light-permeable, so that illumination or light generated by one or more illumination sources IL-1 to IL-n (corresponding to references 108a-108n in FIG. 1) of the luminaire 100 is able to radiate into the hazardous environment. The illumination sources 108a-108n may be any suitable type of illumination source that generates visible light, e.g., incandescent, halogen, fluorescent, metal halide, xenon, LEDs (light emitting diodes), etc.

In FIG. 1, the luminaire 100 includes one or more processors 110, one or more drivers 112 (e.g., drivers for illuminations sources), one or more illumination sources 108a-108n, and one or more illumination sensors 130 that are enclosed in, surrounded by, and/or otherwise protected by the hazardous location enclosure 102.

In some embodiments, the luminaire 100 is communicatively connected to one or more networks via one or more communication interfaces 128a-128m. For example, the luminaire 100 may be communicatively connected to a wireless network via a first communication interface (COM1) 128a and/or may be communicatively connected to a wired network via a second communication interface (COMm) 128m. As such, the luminaire 100 may be a node of a wireless network and/or may be a node of a wired network. Each of the wireless and/or wired networks may include one or more other nodes such as, for example, a back-end computer, controller, or server that is disposed in a non-hazardous environment or otherwise is shielded from the harsh conditions of the hazardous environment. Other examples of nodes which may be included in the wireless and/or wired network may include, in some configurations, one or more other luminaires, sensors, and other devices disposed within the hazardous environment.

Generally speaking, the one or more processors 110 instruct the one or more drivers 112 to energize or activate the one or more illumination sources 108a-108n, e.g., individually or independently, and/or as a set or group in a coordinated manner. For example, the one or more processors 110 may instruct the one or more drivers 112 to energize or activate the one or more illumination sources 108a-108n based on or in accordance with instructions and/or information provided by an ambient light harvesting unit 115 of the luminaire 100. As the illumination sources 108a-108n of the luminaire 100 radiate visible light through the at least partially transparent portion 105 of the hazardous location enclosure 102, the illumination sensors 130 measure the amount of light (e.g., in lumens, lux, etc.) in the environment of the luminaire 100. For instance, the illumination sensors 130 may be positioned near the illumination sources 108a-108n and may face toward the environment, in order to measure the combined light from the illumination sources 108a-108n and from external sources of ambient light (such as, e.g., sunlight, lightning, or other sources of light in the environment) that is reflected back to the luminaire 100.

The ambient light harvesting unit 115 may include a set of computer-executable instructions that are executable by the one or more processors 110 and that are stored on the one or more memories 118 of the luminaire 100, where the one or more memories 118 are, for example, one or more tangible, non-transitory memories, components, or data storage devices. The one or more memories 118 may also store instructions for executing a sensor malfunction unit 120 configured to detect malfunctions of an illumination sensor 130 and generate alarms and/or modify the operation of the luminaire 100 based on detected malfunctions. In some arrangements, the one or more memories 118 may also store other data 122 (which may include, e.g., setpoint values, deadband ranges for setpoint values, setpoint deadband threshold values, sensitivity settings, alarm threshold values, etc.) that is accessible to the one or more processors 110. Additionally, the one or more memories 118 may store other computer-executable instructions 125 that are executable by the one or more processors 110 to cause luminaire 100 perform other operations in addition to ambient light harvesting control. For example, the other computer-executable instructions 125 may be executable by the one or more processors 110 to cause the luminaire 100 to perform its run-time lighting operations, to communicate with other luminaires and/or with a back-end server (e.g., wirelessly) to coordinate lighting functions across a group of luminaires, to execute diagnostic and/or maintenance operations, etc.

Generally speaking, the ambient light harvesting unit 115 may cause the one or more drivers 112 of the luminaire 100 to energize or activate the one or more illumination sources 108a-108n based on the amount of light measured in the environment of the luminaire 100 by the one or more illumination sensors 130, such that the intensity at which the one or more illumination sources 108a-108n are energized decreases as the amount of light measured in the environment of the luminaire 100 increases, and vice versa. In particular, the ambient light harvesting unit 115 may cause the one or more drivers 112 of the luminaire 100 to modify the intensity at which the one or more illumination sources 108a-108n are energized based on the difference between the amount of light in the environment of the luminaire 100 (e.g., including light produced by the illumination sources 108a-108n as well as light from external sources, such as sunlight, other luminaires, flame sources within the hazardous environment, etc.) as measured by the one or more illumination sensors 130 over a certain period of time and a setpoint amount of light associated with the luminaire 100. In some examples, the setpoint value may be pre-configured or pre-defined. Moreover, in some examples, the setpoint value may be modified by a user or an operator In some examples, the ambient light harvesting unit 115 may be configurable by a user to operate in a high sensitivity, medium sensitivity, or low sensitivity setting. Generally speaking, when the ambient light harvesting unit 115 is operating in the low sensitivity setting, the interval of time (e.g., duration of time, period of time, etc.) over which the illumination sensors 130 measure the amount of light in the environment of the luminaire 100 before the intensity of the illumination sources 108a-108n is adjusted is longer, and when the ambient light harvesting unit 115 is operating in the high sensitivity setting, the interval of time over which the illumination sensors 130 measure the amount of light in the environment of the luminaire 100 before the intensity of the illumination sources 108a-108n is adjusted is shorter. In other words, while the ambient light harvesting unit 115 is operating in the low sensitivity setting, the interval of time (over which the amount of light in the environment of the luminaire 100 is measured prior to adjusting the intensity of the illumination sources 108a-108n) has a greater, longer, or larger duration than the duration of the interval of time (over which the amount of light in the environment of the luminaire 100 is measured prior to adjusting the intensity of the illumination sources 108a-108n) while the ambient light harvesting unit 115 is operating in the high sensitivity setting. For instance, the amount of light in the environment of the luminaire 100 may be averaged over the interval of time based on the current sensitivity setting, which may have been selected by the user. Consequently, when the ambient light harvesting unit 115 is operating in the high sensitivity setting, the luminaire 100 may react to changes in the amount of light in the environment of the luminaire 100 detected by the illumination sensors 130 more quickly. In other words, the amount of time required to elapse for the luminaire 100 to react to changes in the amount of light in the environment while set at the high sensitivity setting is shorter than the amount of time required to elapse for the luminaire 100 to react to changes of light in the environment while set at the low sensitivity setting. For example, a high sensitivity setting may be useful in environments in which the amount of light in the environment of the luminaire 100 typically changes frequently and drastically. In contrast, when the ambient light harvesting unit 115 is operating in the low sensitivity setting, the luminaire 100 may react to changes in the amount of light in the environment of the luminaire 100 detected by the illumination sensors 130 more slowly (e.g., more gradually). In other words, the amount of time that elapses prior to the luminaire 100 reacting to changes in the amount of light in the environment while operating in the low sensitivity setting is longer than the amount of time that elapses prior to the luminaire 100 reacting to changes of light in the environment while operating in the high sensitivity setting. For example, a low sensitivity setting may be useful in environments in which the amount of light in the environment of the luminaire 100 typically does not change frequently or drastically. Accordingly, when the ambient light harvesting unit 115 is operating in a low sensitivity setting, the luminaire 100 will not modify the intensity at which its illumination sources 108a-108n are energized based on a momentary change in the amount of light in the environment of the luminaire 100, e.g., a change in ambient light caused by a flash of lightning, or by a user or equipment in the hazardous environment flashing light towards the sensor.

In some examples, the ambient light harvesting unit 115 may cause the one or more drivers 112 of the luminaire 100 to cease modifying (or to adjust the modification of) the intensity at which the one or more illumination sources 108a-108n are energized when the difference between the amount of light in the environment of the luminaire 100 measured by the one or more illumination sensors 130 over the interval of time and the setpoint amount of light associated with the luminaire 100 is below a deadband setpoint threshold value. The deadband setpoint threshold value may be based on the setpoint value (e.g., 20% of the setpoint, 10% of the setpoint, 5% of the setpoint, 1% of the setpoint, etc.). Furthermore, in some examples, the deadband threshold value may be pre-configured or pre-defined. Moreover, in some examples, the deadband threshold value may be modified by a user or an operator.

In other words, when the illumination sensors 130 measure an amount of light that is within a deadband range of the setpoint amount of light, the ambient light harvesting unit 115 may cause the one or more drivers 112 of the luminaire 100 to maintain the current intensity at which they are energizing the one or more illumination sources 108a-108n.

Figure 2:
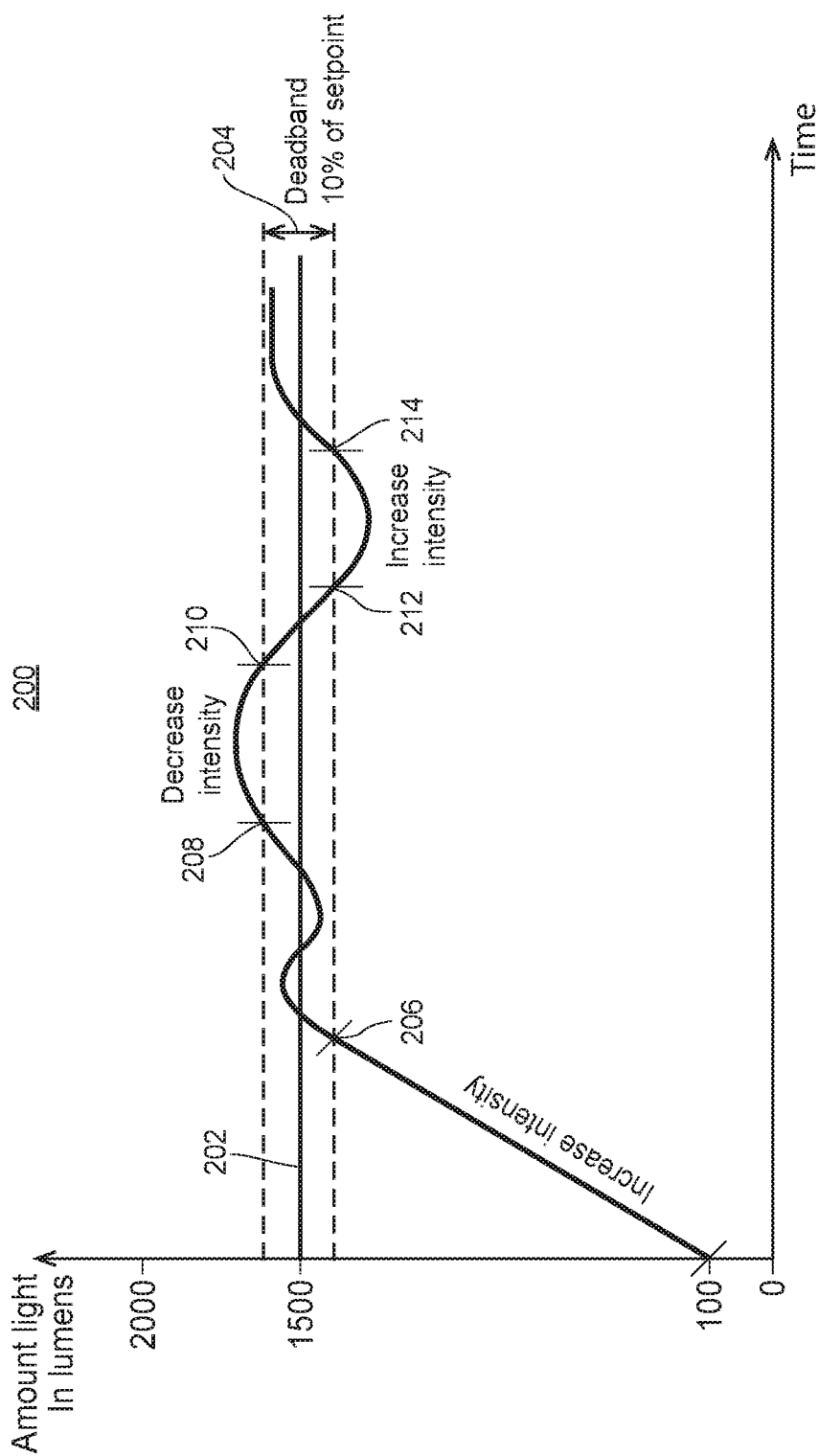
FIG. 2 is a graph illustrating an example measurement of amount of light over time for a hazardous environment and example times at which a self-adjusting luminaire's illumination intensity is increased and decreased to maintain a setpoint deadband.

For example, FIG. 2 illustrates a graph 200 illustrating an example measurement of the amount of light in the environment of the luminaire 100 over time and example times at which illumination intensity is increased and decreased to maintain a 10% setpoint deadband. In the example shown in FIG. 2, the setpoint (202) amount of light associated with the luminaire 100 is 1500 lumens, and the deadband (204) is a range spanning ±10% of the setpoint 202. As shown in FIG. 2, the illumination intensity is increased until the difference between the amount of light in the environment of the luminaire 100 and the setpoint amount of light associated with the luminaire 100 is less than 10% of the setpoint (i.e., less than 150 lumens below the setpoint, at point 206 as shown in FIG. 2). After this point, the illumination intensity is maintained until the difference between the amount of light in the environment of the luminaire 100 and the setpoint amount of light associated with the luminaire 100 is greater or more than 10% of the setpoint (i.e., greater or more than 150 lumens above the setpoint, at point 208 as shown in FIG. 2), at which point the illumination intensity is decreased until the difference between the amount of light in the environment of the luminaire 100 and the setpoint amount of light associated with the luminaire 100 is less than 10% of the setpoint (i.e., less than 150 lumens above the setpoint, at point 210 as shown in FIG. 2). After this point, the illumination intensity is maintained until the difference between the amount of light in the environment of the luminaire 100 and the setpoint amount of light in the environment of the luminaire 100 is greater or more than 10% of the setpoint (i.e., greater or more than 150 lumens below the setpoint, at point 212 as shown in FIG. 2), at which point the illumination intensity is increased until the difference between the amount of light in the environment of the luminaire 100 and the setpoint amount of light associated with the luminaire 100 is less than 10% of the setpoint (i.e., less than 150 lumens below the setpoint, at point 214 as shown in FIG. 2), and so on.

Advantageously, by maintaining the intensity of the illumination sources 108a-108n while and when the difference between the measured amount of light in the environment of the luminaire 100 and the setpoint amount of light associated with the luminaire 100 is below a deadband setpoint threshold value, or otherwise is significantly smaller or less than the setpoint value, fewer modifications and adjustments to the intensity are needed. Accordingly, users or operators in the hazardous environment will not be irritated or distracted by frequent small, inconsequential intensity adjustments (which may appear to the user or operator as flickering or flashing) when the measured amount of light in the environment of the luminaire 100 is already within a reasonable tolerance range of the setpoint amount of light associated with the luminaire 100.

Figure 3:
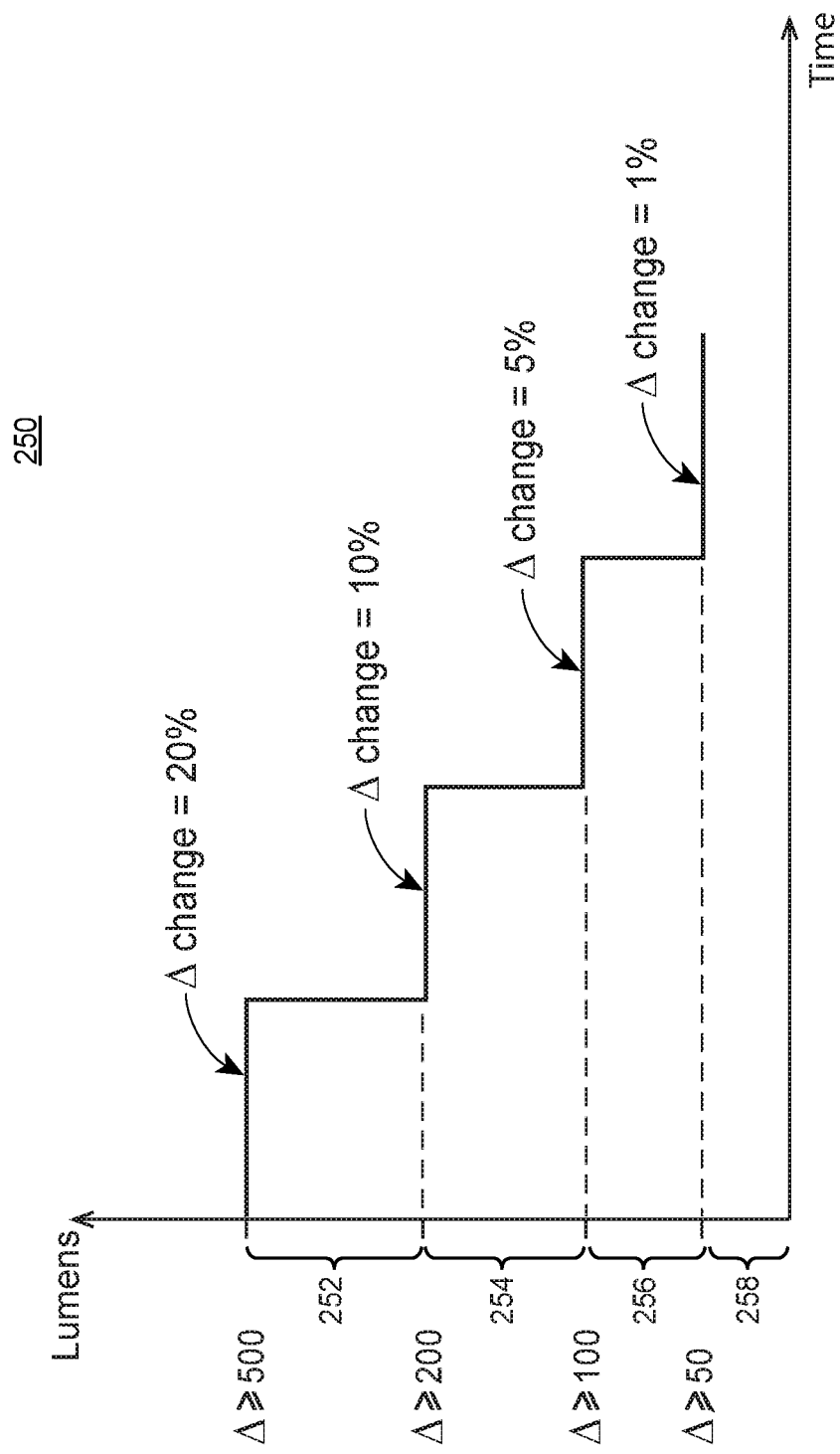
FIG. 3 is a graph illustrating example step modifications of illumination intensity made by a self-adjusting luminaire based on a difference between a measured amount of light in a hazardous environment and a setpoint amount of light for the hazardous environment.

Furthermore, referring back to FIG. 1, in some examples, the ambient light harvesting unit 115 may cause the one or more drivers 112 of the luminaire 100 to modify the intensity of the one or more illumination sources 108a-108n in steps based on the difference between the amount of light in the environment of the luminaire 100 measured by the one or more illumination sensors 130 and the setpoint amount of light associated with the luminaire 100. For instance, FIG. 3 illustrates a graph 250 illustrating exemplary step modifications of the intensity of the one or more illumination sources 108a-108n. As shown in FIG. 3, when the difference between the amount of light in the environment of the luminaire 100 measured by the one or more illumination sensors 130 and the setpoint amount of light associated with the luminaire 100 is within a first range 252 (e.g., a difference of between 200 and 500 lumens), the illumination intensity is increased (when the measured amount of light in the environment of the luminaire 100 is less than the setpoint amount of light associated with the luminaire 100) or decreased (when the measured amount of light in the environment of the luminaire 100 is greater or more than the setpoint amount of light associated with the luminaire 100) by a first intensity factor (e.g., increased or decreased by 20%). When the difference between the amount of light in the environment of the luminaire 100 measured by the one or more illumination sensors 130 and the setpoint amount of light associated with the luminaire of the luminaire 100 is within a second range 354 (e.g., a difference of between 100 and 200 lumens), the illumination intensity is increased or decreased by a second intensity factor (e.g., by increased or decreased by 10%). Similarly, when the difference is within a third range 256 (e.g., a difference of between 100 and 50 lumens), the illumination intensity is increased or decreased by a third intensity factor (e.g., by increased or decreased by 5%), and when the difference is within a fourth range 258 (e.g., a difference of between 50 and 0 lumens), the illumination intensity is increased or decreased by a fourth intensity factor (e.g., by increased or decreased by 1%). Accordingly, when the difference between the amount of light in the environment of the luminaire 100 measured by the one or more illumination sensors 130 and the setpoint amount of light associated with the luminaire 100 is of a larger magnitude, the illumination intensity is adjusted rapidly by larger steps, but when the difference between the amount of light in the environment of the luminaire 100 measured by the one or more illumination sensors 130 and the setpoint amount of light associated with the luminaire 100 is of a smaller magnitude, the illumination intensity is adjusted more slowly by smaller steps. Using the technique depicted in FIG. 3, advantageously, the amount of light in the environment of the luminaire 100 may be quickly adjusted to a very precise setpoint amount of light. Furthermore, because the changes to the illumination intensity are proportional to the difference between the measured amount of light in the environment of the luminaire 100 and the setpoint amount of light associated with the luminaire, the adjustment process appears to be smooth to a user or operator working in the hazardous environment. Accordingly, users or operators are not distracted, startled, or annoyed as the illumination intensity is adjusted.

Referring back to FIG. 1, the sensor malfunction unit 120 may cause the luminaire 100 to detect malfunctions of an illumination sensor 130 and generate alarms and/or modify the operation of the luminaire 100 based on detected malfunctions of the illumination sensor 130. In particular, the sensor malfunction unit 120 may determine that an illumination sensor 130 is malfunctioning when measurements of the amount of light in the environment of the luminaire 100 by the illumination sensor 130 fail to change (or change very little) over an interval of time (e.g., 15 minutes, 20 minutes, 30 minutes, etc.) during which the intensity of the illumination sources 108a-108n has been modified by more than an alarm threshold amount. For instance, in some examples, the interval period of time and/or the alarm threshold amount may be pre-configured or pre-defined. Moreover, in some examples, the interval period of time and/or the alarm threshold amount may be modified by a user or an operator In some examples, upon the sensor malfunction unit 120 determining that an illumination sensor 130 is malfunctioning, the sensor malfunction unit 120 may generate an alarm indicating that the sensor 130 is malfunctioning. In some examples, the alarm may be transmitted to an external device, such as a controller or a device associated with a user or operator in the hazardous environment. In some examples, upon the sensor malfunction unit 120 determining that an illumination sensor 130 is malfunctioning, the sensor malfunction unit 120 may cause the one or more drivers 112 of the luminaire 100 to modify the intensity of the one or more illumination sources 108a-108n to full intensity (e.g., 100% intensity), e.g., as a default mitigating response. Accordingly, if the illumination sensor 130 is malfunctioning by over-measuring the amount of light in the environment of the luminaire 100, users or operators in the hazardous environment will still be provided with lighting as needed. Of course, other mitigating responses may be defined and additionally or alternatively performed by the luminaire 100 upon detecting the malfunction of the sensors 130. Advantageously, because measurements from the on-board illumination sensor(s) 130 itself are used to determine whether the illumination sensor 130 is malfunctioning, information from external sources (e.g., other devices or sensors connected to the luminaire via wired or wireless connections) is not necessary for the sensor malfunction unit 120 to detect and respond to malfunctioning illumination sensors 130.

Figure 4:
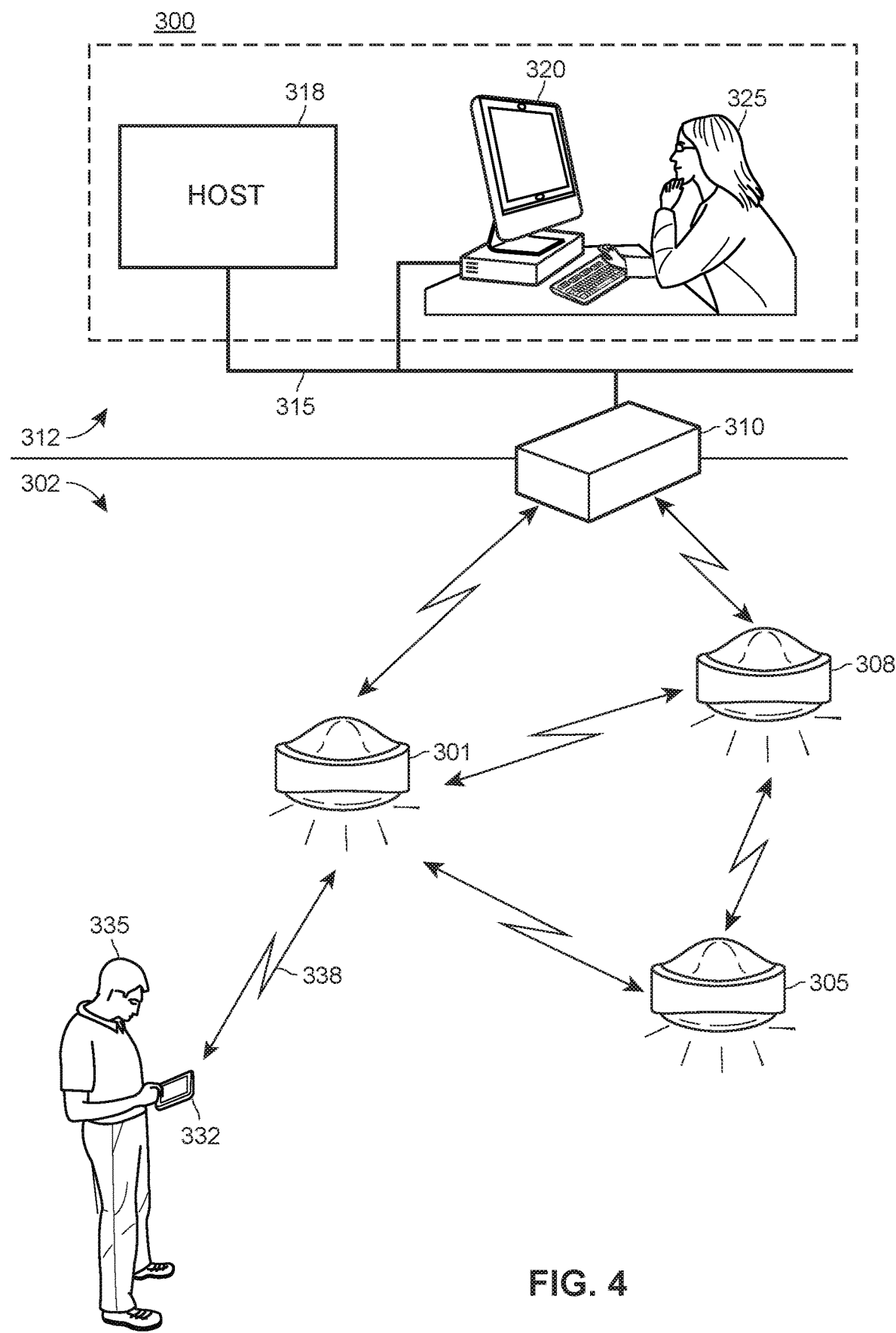
FIG. 4 depicts an example hazardous environment in which the self-adjusting hazardous environment lighting unit, light fixture, or luminaire of FIG. 1 may be located or disposed.

FIG. 4 depicts an example hazardous environment in which the self-adjusting hazardous environment detected lighting unit, light fixture, or luminaire of FIG. 1 may be located or disposed. For example, the self-adjusting HE luminaire 301 of FIG. 4 may be an embodiment of the self-adjusting HE luminaire 100. For ease of discussion (and not for limitation purposes), FIG. 4 is discussed below in conjunction with reference numbers included in FIG. 1.

As illustrated in FIG. 4, the self-adjusting luminaire 301 is a node of a wireless network 302 of the hazardous environment 300, where the wireless network 302 includes other nodes such as other luminaires 305, 308 and a wireless gateway 310 which communicatively interconnects the wireless network 302 and a wired network 312 associated with the hazardous environment 300. In some examples, each of the luminaires 301, 305, 308 is a self-adjusting luminaire.

In other examples, one of the luminaires 301 is a self-adjusting primary luminaire, while the other luminaires 305, 308 are secondary luminaires, such as those as described in Indian Patent Application No. 201921036250A, the content of which is hereby incorporated by reference in its entirety.

In particular, in these examples, the self-adjusting primary luminaire 301 may communicate wirelessly with other nodes of a wireless network within a hazardous environment, while the secondary luminaires 305, 308 communicate with the self-adjusting primary luminaire 301 via respective wired communication interfaces. In particular, each wired communication interface may include both a digital component or portion and an analog component or portion so that both digital and analog signals may delivered over a common, integral, or single, physical transmission medium (such as a wire, a cable, etc.). The digital component may deliver administrative messages (e.g., such as alert messages, status messages, sensor data, configuration messages, and/or other types of messages that do not include any control or driving instructions) between the self-adjusting primary luminaire 301 and the secondary luminaires 305, 308, while the analog component may deliver driving commands issued by the self-adjusting primary luminaire 301 to the secondary luminaires 305, 308, e.g., including commands indicating intensity levels at which illumination sources of the secondary luminaires 305, 308 are to be energized. Accordingly, the self-adjusting primary luminaire 301 may send driving commands to the secondary luminaires 305, 308 via the analog component of its wired communication interface, and may send administrative messages to (and receive administrative messages from) the secondary luminaires 305, 308 via the digital component of its wired communication interface. In some examples, self-adjusting primary luminaire 301 may have on-board sensors, while the secondary luminaires 305, 308 may not have on-board illumination sensors. In such examples, the self-adjusting primary luminaire 301 may generate driving commands for modifying the intensity of both its own illumination sources and the illumination sources of the secondary luminaires 305, 308 based on a difference between a setpoint amount of light and an amount of light measured by the on-board illumination sensors of the self-adjusting primary luminaire 301.

The wired network 312 includes a wired backbone 315 (e.g., which may be Ethernet, broadband, fiber optic, or any suitable type of wired backbone) to which a back-end server, host, controller, computing device, and/or group of computing devices behaving as a single logical server or host 318 is communicatively connected. The host 318 may be implemented by an individual computing device, by one or more controllers and/or systems associated with the hazardous environment (such as a programmable logic controller (PLC), distributed control system (DCS), or other type of industrial process control system), by a bank of servers, by a computing cloud, or by any suitable arrangement of one or more computing devices. The host 318 may service nodes of the wired network 312 and/or nodes of the wireless network 302. For example, the host 318 may provide (e.g., via download or other mechanism) configuration and/or operating instructions 125 and/or data 122 (e.g., that correspond to governing or controlling run-time lighting, diagnostic, maintenance, and/or other operations) to one or more nodes of the network(s) 302, 312, such as the self-adjusting luminaire 301, other luminaires 305, 308, and/or other nodes. Further, the host 318 may provide instructions and/or data that are related to ambient light harvesting settings for the self-adjusting luminaire 301. For instance, the host 318 may provide a setpoint amount of light associated with the self-adjusting luminaire 301, a deadband range for the setpoint amount of light or a setpoint deadband threshold value, a sensitivity setting, an alarm threshold value, etc.

Wired network 312 also includes a user computing device 320 which is communicatively connected via the backbone 315. The server 318 and the user computing device 320 may be disposed or located in one or more remote or enclosed locations 322 that protect the server 318 and the user computing device 320 from the harsh conditions of the hazardous environment 300. In some arrangements (not shown in FIG. 4), the protected user computing device 320 may be communicatively connected to the wired backbone 315 via a wireless link and access point, where the access point is communicatively connected in a wired manner to the backbone 315. A user 325 may utilize the computing device 320 to configure, modify, and/or otherwise provide instructions and/or data utilized by and/or stored at the host 318, and/or to view data and information provided by other devices and/or nodes via the wired network 312 and/or the wireless network 302 corresponding to the hazardous environment 300. For example, via the user computing device 320, the user 325 may provide input indicating a setpoint amount of light associated with the self-adjusting luminaire 301, a deadband range for the setpoint amount of light or a setpoint deadband threshold value, an alarm threshold value, etc., input indicating a preferred ambient light harvesting sensitivity setting (high, medium, low, etc.) or input regarding other configuration instructions for the luminaire 301.

The wired network 312 and the wireless network 302 may be in compliance with applicable hazardous environment standards and regulations. For example, the wireless network 302 may utilize Wi-Fi, WirelessHART, and/or one or more other communication protocols that are suitable for (e.g., is in compliance with all regulations and standards that are applicable to) the hazardous environment 300, and devices of the networks 302, 312 that are located at least partially within the hazardous environment 300 (e.g., the luminaire self-adjusting 301, the other luminaires 305, 308, the wireless gateway 310, and the backbone 315) may similarly comply with all applicable hazardous environment standards and regulations that pertain to the hazardous environment 300.

As further depicted in FIG. 4, the example hazardous environment 300 includes a portable computing device 332 that is operated by a user 335 within the hazardous environment 300. The portable computing device 332 is compliant with hazardous environment standards and regulations applicable to the hazardous environment 300. For example, the portable computing device 332 may be configured to communicate with the self-adjusting luminaire 301, the other luminaires 305, 308, and/or with other nodes of the wireless network 302 using a WirelessHART protocol or some other protocol that is suitable for (e.g., is in compliance with all regulations and standards that are applicable to) the hazardous environment 300. The portable computing device 332 may be any type of wireless or mobile computing device, such as a laptop, tablet, smart phone, smart device, wearable computing device (e.g., virtual reality device, headset, or other body-borne device), etc. The portable computing device 332 may or may not be a node of the wireless network 302.

In some embodiments, the portable computing device 332 is a server, host, controller, computing device, and/or group of computing devices behaving as a single logical server or host that services the nodes of the wireless network 302. For example, the host 332 may provide (e.g., via download or other mechanism) configuration and/or operational instructions 125 and/or data 122 (e.g., that correspond to governing or controlling run-time lighting, diagnostic, maintenance, and/or other operations) to one or more nodes of the wireless network 302, such as to the self-adjusting luminaire 301 and/or the other luminaires 305, 308. Further, the host 332 may provide instructions and/or data that are related to ambient light harvesting settings for the self-adjusting luminaire 301. For instance, the host 332 may provide a setpoint amount of light associated with the self-adjusting luminaire 301, a deadband range for the setpoint amount of light or a setpoint deadband threshold value, an alarm threshold value, etc. A user 335 may utilize a user interface of the host 332 to configure, modify, and/or otherwise provide instructions and/or data stored at the host 332, and/or to view data and information provided by other devices and/or nodes via the wireless network 302 corresponding to the hazardous environment 300. For example, the user 335 may provide input indicating a setpoint amount of light associated with the self-adjusting luminaire 301, a deadband range for the setpoint amount of light or a setpoint deadband threshold value, a sensitivity setting for the self-adjusting luminaire 301, an alarm threshold value, etc., or input regarding other configuration instructions for the luminaire.

Generally speaking, a user 325, 335 may utilize one or more of the user interface computing devices 320, 332 to provide input indicating a setpoint amount of light associated with the self-adjusting luminaire 301, a deadband range for the setpoint amount of light or a setpoint deadband threshold value, a sensitivity setting for the self-adjusting luminaire 301, an alarm threshold value, etc., or to provide input regarding other configuration instructions for the self-adjusting luminaire 301. As one example, a user 325, 335 may provide input indicating a sensitivity level setting for the ambient light harvesting of the self-adjusting luminaire 301. In some examples, the input may indicate that particular luminaires are to be set at different sensitivity levels. For instance, the self-adjusting luminaire 301 may be set to a high sensitivity level, while another luminaire 305 may be set to a low sensitivity level, and still another luminaire 308 is set to a medium sensitivity level.

Figure 5:
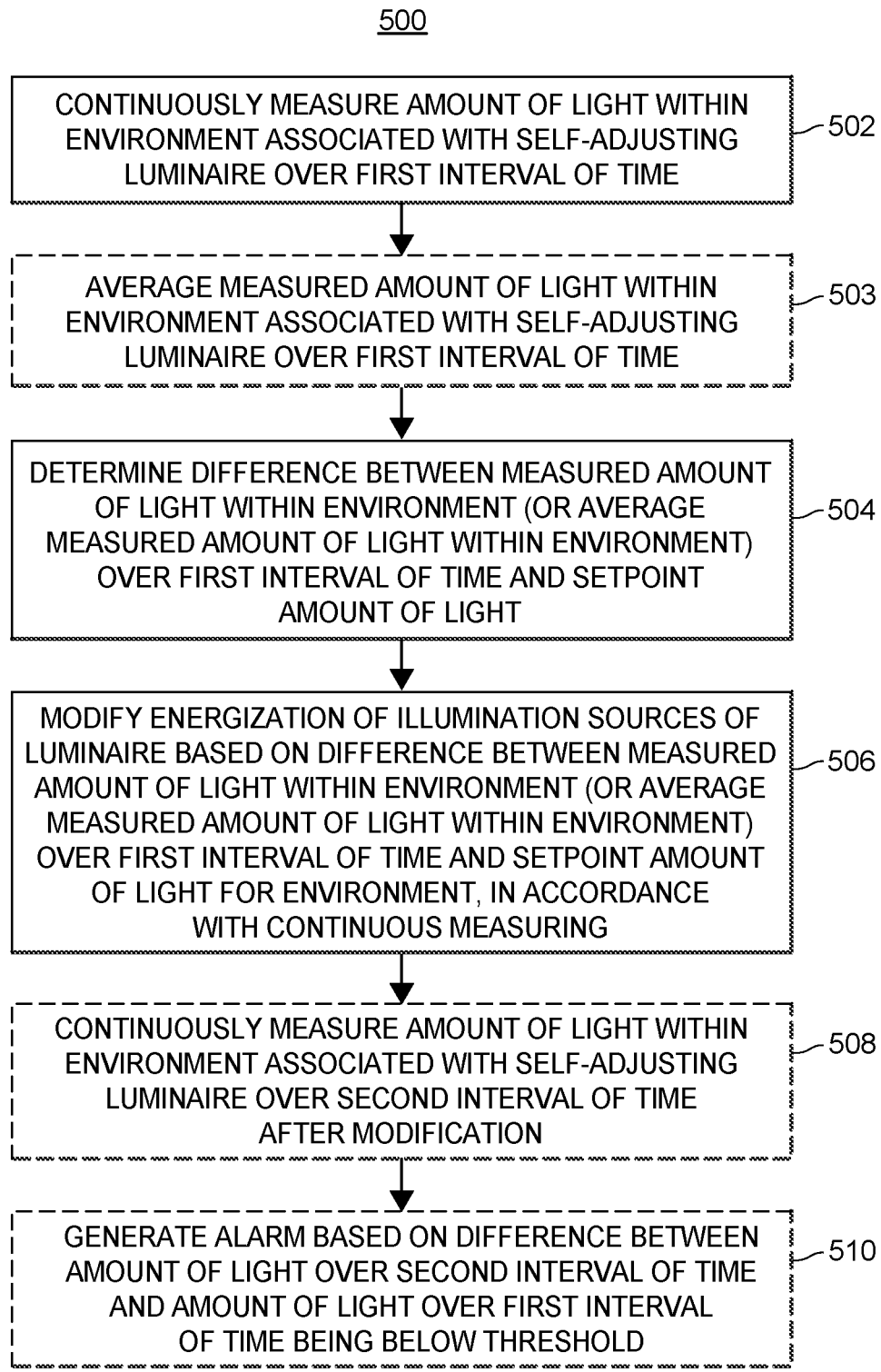
FIG. 5 is a flow diagram of an example method performed by a self-adjusting hazardous environment luminaire.

FIG. 5 is a flow diagram of an example method 500 performed by a self-adjusting hazardous environment luminaire, such as the luminaire 100 depicted in FIG. 1 or the luminaire 301 depicted in FIG. 4. For example, the ambient light harvesting unit 115 of the luminaire 100 may include instructions which, when executed by the one or more processors 110, cause the self-adjusting hazardous environment luminaire 100 to perform at least a portion of the method 500. The method 500 may include additional, fewer, and/or alternate actions, in embodiments.

At block 502, the self-adjusting luminaire may continuously measure an amount of light within an environment associated with the self-adjusting luminaire over a first interval of time, e.g., by utilizing one or more sensors included in the self-adjusting luminaire. The amount of light in the environment associated with the self-adjusting luminaire may include ambient light in the environment as well as light provided by one or more illumination sources of the luminaire, and may be measured in lumens, lux, or any other suitable unit of measure.

Optionally, at block 503, the self-adjusting luminaire may average the amount of light measured in the environment associated with the self-adjusting luminaire over the first interval of time. A duration of the interval of time may correspond to a sensitivity setting of the luminaire, for example.

At block 504, the self-adjusting luminaire may determine a difference (which may be, e.g., a magnitude of a difference, a difference value, etc.) between the measured amount of light in the environment associated with the self-adjusting luminaire (or the average amount of light measured in the environment associated with the self-adjusting luminaire over the first interval of time) and a setpoint amount of light associated with the self-adjusting luminaire. In some examples, the setpoint amount of light associated with the luminaire may be pre-configured. In some examples, the luminaire may receive an indication of the setpoint amount of light associated with the luminaire selected by a user, e.g., via a wired interface or a wireless interface of the self-adjusting luminaire.

At block 506, the self-adjusting luminaire may modify the energization of the one or more illumination sources of the self-adjusting luminaire based on the determined difference between a measured amount of light in the environment and a setpoint amount of light, in accordance with the continuous measuring, e.g., over the first interval of time. In some examples, the self-adjusting luminaire may modify the intensity of the energization of the one or more illumination sources by multiplying the current intensity of the energization by an intensity factor, where the intensity factor corresponds to a magnitude of the difference between the measured amount of light in the environment and the setpoint amount of light. For instance, the intensity factor may be one of a plurality of intensity factors, with each intensity factor corresponding to a particular range of values of the difference between the measured amount of light in the environment and the setpoint amount of light (e.g., as discussed above with respect to FIG. 3). In some examples, a first calculated difference, falling within a first range of values for the difference between the measured amount of light in the environment and the setpoint amount of light, may correspond to a first intensity factor, while a second calculated difference, smaller or less than the first calculated difference, and falling into a second range of values for the difference between the measured amount of light in the environment and the setpoint amount of light (different from the first range of values), may correspond to a second intensity factor that is smaller or less than the first intensity factor.

That is, when the difference between the measured amount of light in the environment and the setpoint amount of light is of a greater magnitude, the intensity of energization is modified based on multiplying the current intensity by a larger intensity factor, but when the difference between the measured amount of light in the environment and the setpoint amount of light is of a smaller magnitude, the intensity of energization is modified based on multiplying the current intensity by a smaller intensity factor.

Optionally, at block 508, the self-adjusting luminaire may continuously measure a second amount of light within the environment associated with the self-adjusting luminaire by the one or more sensors included in the self-adjusting luminaire over a second interval of time occurring after the modification has been performed.

Optionally, at block 510, the self-adjusting luminaire may generate an alarm corresponding to a difference between the measured amount of light over the first time interval and the measured amount of light over the second time interval. In some instances, the alarm may be generated when the difference between the measured amount of light over the first interval of time and the measured amount of light over the second interval of time is zero, or is otherwise below an alarm threshold amount of light difference, thus indicating a possible malfunction of the on-board sensors.

In some examples, the method 500 may include modifying, over the second interval of time, an energization of the one or more illumination sources of the self-adjusting luminaire based on the alarm. For example, the energization of the one or more illumination sources may be modified to a full intensity or 100% intensity based on the alarm. In some examples, the method 500 may include transmitting an indication of the alarm via a wired interface or a wireless interface of the self-adjusting luminaire, e.g., to a user and/or to a back-end computing device.

In some examples (not shown in FIG. 5), the method 500 may further include ceasing to modify the energization of the one or more illumination sources (or otherwise adjusting the modification) when the difference between the measured amount of light in the environment and the setpoint amount of light is less than a deadband setpoint threshold value calculated based on the setpoint amount of light (e.g., as discussed above with respect to FIG. 2). For example, the deadband setpoint threshold value may be 5% of the setpoint amount of light, 10% of the setpoint amount of light, 15% of the setpoint amount of light, etc. Accordingly, when the difference between the measured amount of light in the environment and the setpoint amount of light in the environment is less than 5% (or 10%, 15%, etc.) of the setpoint amount of light, the self-adjusting luminaire may cease modifying the energization of the one or more illumination sources, e.g., until the difference between the measured amount of light in the environment and the setpoint amount of light associated with the luminaire is greater or more than 5% (or 10%, 15%, etc.) of the setpoint amount of light, at which point modifying may resume.

Accordingly, embodiments of the novel and inventive self-adjusting hazardous environment lighting unit, light fixture, or luminaire disclosed herein provide significant advantages over known techniques for using ambient light harvesting techniques in hazardous environments.

The following additional considerations apply to the foregoing discussion:

A portable computing device, which may operate in conjunction with embodiments of the hazardous environment lighting unit, light lighting unit, light fixture, or luminaire disclosed herein can be any suitable device capable of wireless communications such as a smartphone, a tablet computer, a laptop computer, a wearable or body-borne device, a drone, a camera, a media-streaming dongle or another personal media device, a wireless hotspot, a femto-cell, or a broadband router. Further, the portable computing device and/or embodiments of the disclosed hazardous environment lighting unit, light fixture, or luminaire can operate as an internet-of-things (IoT) device or an Industrial internet-of-things (IIoT) device.

Certain embodiments are described in this disclosure as including logic or a number of components or modules. Modules may be software modules (e.g., code stored on non-transitory machine-readable medium) or hardware modules. A hardware module is a tangible, non-transitory unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for a self-adjusting hazardous environment lighting unit, light fixture, or luminaire. Thus, while this document illustrates and describes particular embodiments and applications, the disclosed embodiments are not limited to the precise construction and components disclosed. Various modifications, changes and variations, which will be apparent to those of ordinary skill in the art, may be made in the disclosed arrangement, operation and details of the method, and apparatus without departing from the spirit and scope defined in the appended claims.

What is claimed is:

1. A luminaire, comprising:
   one or more processors;
   one or more illumination sources;
   one or more drivers;
   one or more illumination sensors configured to measure amounts of light in an environment associated with the luminaire, the light in the environment associated with the luminaire including both ambient light and light provided by the one or more illumination sources; and
   one or more memories storing a set of computer-executable instructions that, when executed by the one or more processors, cause the luminaire to:
   cause the one or more drivers to energize the one or more illumination sources to generate light at a first intensity level;
   determine a modification to the first intensity level based on a magnitude of a difference between a setpoint amount of light and a first amount of light, the first amount of light measured by the one or more illumination sensors while the one or more illumination sources are energized to generate light at the first intensity level; and
   cause the one or more drivers to modify the first intensity level based on the determined modification.

2. The luminaire of claim 1, wherein the one or more drivers modify the first intensity level at a first time, and the computer-executable instructions, when executed by the one or more processors, cause the luminaire further to:
   cause the one or more drivers to adjust the modification to the first intensity level when a magnitude of the difference between the setpoint amount of light and an amount of light corresponding to the modified first intensity level at a second time subsequent to the first time is less than a threshold value, the threshold value determined based on the setpoint amount of light.

3. The luminaire of claim 1, wherein the luminaire further comprises one or more of a wired interface or a wireless interface communicatively connecting the luminaire to at least one of a back-end system or a user interface, and wherein the computer-executable instructions, when executed by the one or more processors, cause the luminaire further to:
   receive an indication of the setpoint amount of light via the one or more of the wired interface or the wireless interface.

4. The luminaire of claim 1, wherein the first amount of light is an averaged first amount of light measured by the one or more illumination sensors while the one or more illumination sources are energized to generate light at the first intensity level over an interval of time; and wherein the difference between the setpoint amount of light and the first amount of light is a difference between the setpoint amount of light and the averaged first amount of light.

5. The luminaire of claim 4, wherein the computer-executable instructions, when executed by the one or more processors, cause the one or more drivers to modify the first intensity level upon an ending of the interval of time.

6. The luminaire of claim 1, wherein:
the determination of the modification to the first intensity level based on the magnitude of the difference between the setpoint amount of light and the first amount of light includes a calculation of the difference between the setpoint amount of light and the first amount of light; and
the modification to the first intensity level includes a multiplying of the first intensity level by an intensity factor, the intensity factor corresponding to the calculated difference.

7. The luminaire of claim 6, wherein the intensity factor is one of a plurality of intensity factors, and wherein each of the plurality of intensity factors corresponds to a respective range of values of differences between the setpoint amount of light and measured amounts of light.

8. The luminaire of claim 7, wherein a first calculated difference, corresponding to a first range of values, corresponds to a first intensity factor; and
wherein a second calculated difference that is less than the first calculated difference and that corresponds to a second range of values corresponds to a second intensity factor that is less than the first intensity factor.

9. The luminaire of claim 1, wherein the computer-executable instructions, when executed by the one or more processors, cause the luminaire further to:
generate an alarm based on a magnitude of a difference between the first amount of light and a second amount of light, the second amount of light measured by the one or more illumination sensors while the one or more illumination sources are energized to generate light at the modified first intensity level.

10. The luminaire of claim 9, wherein the alarm corresponds to the magnitude of the difference between the first amount of light and the second amount of light being less than a threshold.

11. The luminaire of claim 9, wherein the computer-executable instructions, when executed by the one or more processors, cause the luminaire further to:
upon the generation of the alarm, cause the one or more drivers to energize the one or more illumination sources to generate light at a second intensity.

12. The luminaire of claim 11, wherein the second intensity is 100% intensity.

13. The luminaire of claim 9, wherein the luminaire further comprises one or more of a wired interface or a wireless interface communicatively connecting the luminaire to at least one of a back-end system or a user interface, and wherein the computer-executable instructions, when executed by the one or more processors, cause the luminaire further to:
transmit an indication of the alarm via the at least one of the wired interface or the wireless interface.

14. A method performed by a self-adjusting luminaire, the method comprising:
continuously measuring, by one or more sensors included in the self-adjusting luminaire over an interval of time, an amount of light within an environment associated with the self-adjusting luminaire, the light within the environment associated with the self-adjusting luminaire including both ambient light and light provided by one or more illumination sources of the luminaire; and
modifying, over the interval of time in accordance with the continuous measuring, an energization of the one or more illumination sources of the self-adjusting luminaire based on a magnitude of a difference between a measured amount of light in the environment and a setpoint amount of light.

15. The method of claim 14, further comprising:
adjusting the modifying of the energization of the one or more illumination sources when the difference between the measured amount of light in the environment and the setpoint amount of light is less than a threshold value, the threshold value calculated based on the setpoint amount of light.

16. The method of claim 14, further comprising:
receiving an indication of the setpoint amount of light via a wired interface or a wireless interface communicatively connecting the self-adjusting luminaire to at least one of a back-end system or a user interface.

17. The method of claim 14,
further comprising averaging the amount of light within an environment associated with the self-adjusting luminaire over the interval of time; and
wherein modifying, over the interval of time in accordance with the continuous measuring, the energization of the one or more illumination sources of the self-adjusting luminaire based on the difference between the measured amount of light in the environment and the setpoint amount of light includes modifying the energization of the of the one or more illumination sources of the self-adjusting luminaire based on a difference between the average measured amount of light in the environment over the interval of time and the setpoint amount of light.

18. The method of claim 14, wherein modifying, over the interval of time in accordance with the continuous measuring, the energization of the one or more illumination sources of the self-adjusting luminaire based on the difference between the measured amount of light in the environment and the setpoint amount of light includes:
calculating the difference between the setpoint amount of light and the measured amount of light in the environment; and
modifying an intensity level of the energization of the one or more illumination sources of the self-adjusting luminaire based on multiplying a current intensity level of the energization of the one or more illumination sources by an intensity factor, the intensity factor corresponding to the calculated difference.

19. The method of claim 18, wherein the intensity factor is one of a plurality of intensity factors, and wherein each of the plurality of intensity factors corresponds to a respective range of values of differences between the setpoint amount of light and measured amounts of light.

20. The method of claim 18, wherein a first calculated difference, corresponding to a first range of values, corresponds to a first intensity factor; and
wherein a second calculated difference that is less than the first calculated difference and that corresponds to a second range of values corresponds to a second intensity factor that is less than the first intensity factor.

21. The method of claim 14, wherein the interval of time is a first interval of time and wherein the measured amount of light is a first measured amount of light, and wherein the method further comprises:

subsequent to modifying the energization of the one or more illumination sources, continuously measuring, by the one or more sensors included in the self-adjusting luminaire over a second interval of time, a second amount of light within the environment associated with the self-adjusting luminaire; and generating an alarm based on a magnitude of a difference between the second measured amount of light and the first measured amount of light.

22. The method of claim 21, wherein the alarm corresponds to the magnitude of the difference between the first measured amount of light and the second measured amount of light being less than a threshold.

23. The method of claim 21, wherein the modifying of the energization of the one or more illumination sources is a first modification, and the method further comprises:

upon generating the alarm, performing a second modification to the energization of the one or more illumination sources of the self-adjusting luminaire.

24. The method of claim 23, wherein performing the second modification to the energization of the one or more illumination sources of the self-adjusting luminaire includes modifying the energization of the one or more illumination sources of the self-adjusting luminaire to 100% intensity.

25. The method of claim 21, further comprising:

transmitting an indication of the alarm via at least one of a wired interface or a wireless interface of the self-adjusting luminaire.

\* \* \* \* \*